United States Patent
Bianchi et al.

(10) Patent No.: US 12,007,020 B1
(45) Date of Patent: Jun. 11, 2024

(54) TRANSMISSION SHIFT TORQUE CHARACTERISTICS AND OPTIMIZED ENGINE TORQUE CONTROL USING PREDICTIVE SHIFT REQUEST MANAGEMENT

(71) Applicant: FCA US LLC, Auburn Hills, MI (US)

(72) Inventors: Pedro V. D. Bianchi, Campinas (BR); Godla Sagar Naidu, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/362,536

(22) Filed: Jul. 31, 2023

(51) Int. Cl.
| F02D 41/02 | (2006.01) |
| F16H 59/14 | (2006.01) |
| F16H 59/74 | (2006.01) |
| F16H 61/04 | (2006.01) |

(52) U.S. Cl.
CPC ....... *F16H 61/0437* (2013.01); *F02D 41/023* (2013.01); *F16H 59/14* (2013.01); *F16H 59/74* (2013.01); *F02D 2200/50* (2013.01)

(58) Field of Classification Search
CPC ...... F16H 61/0437; F16H 59/14; F16H 59/74; F02D 41/023; F02D 2200/50
See application file for complete search history.

(56) References Cited

U.S. PATENT DOCUMENTS

| 6,994,653 | B2 * | 2/2006 | Hartmann | F02D 41/0205 477/107 |
| 7,270,624 | B2 | 9/2007 | Steen et al. | |
| 7,740,558 | B2 | 6/2010 | Matsumura et al. | |
| 8,109,857 | B2 | 2/2012 | Roses et al. | |
| 8,241,177 | B2 * | 8/2012 | Doering | F02D 41/0007 477/33 |
| 8,612,104 | B2 | 12/2013 | Kojima et al. | |
| 8,784,262 | B2 | 7/2014 | Tsujimura et al. | |
| 9,150,213 | B2 * | 10/2015 | Ishikawa | B60W 10/107 |
| 10,337,613 | B2 * | 7/2019 | Attard | F02D 41/023 |
| 10,549,744 | B2 * | 2/2020 | Doering | B60W 10/06 |
| 2006/0283273 | A1 | 12/2006 | Steen et al. | |

FOREIGN PATENT DOCUMENTS

| CN | 113007340 A | | 6/2021 | |
| GB | 2315132 A | * | 1/1998 | ............. F16H 61/12 |
| JP | 2009162147 A | * | 7/2009 | ........... F02D 41/023 |
| JP | 2011218945 A | * | 11/2011 | |

* cited by examiner

*Primary Examiner* — Sherry L Estremsky
(74) *Attorney, Agent, or Firm* — Jeremy J. Klobucar

(57) ABSTRACT

Predictive transmission shift request and engine torque control techniques include transmitting, from an engine control module (ECM) to a transmission control module (TCM), engine torque information and receiving back a predictive shift request for a transmission generated based on a set of known time delays and the engine torque information, controlling, by the ECM, engine torque actuators in response to and based on the predictive torque request to prepare the engine for the transmission shift operation, receiving, from the TCM, an actual shift request indicative the TCM and the transmission beginning to execute transmission shift operation, and controlling, by the ECM, the engine torque actuators in response to and based on the actual shift request to adjust a torque output of the engine during the transmission shift operation to provide a faster and smoother transmission shift.

20 Claims, 4 Drawing Sheets

TRANSMISSION SHIFT TORQUE CHARACTERISTICS AND OPTIMIZED ENGINE TORQUE CONTROL USING PREDICTIVE SHIFT REQUEST MANAGEMENT

FIELD

The present application generally relates to vehicle powertrains and, more particularly, to techniques for improved transmission shift torque characteristics and optimized engine torque control using predictive shift request management.

BACKGROUND

Many vehicles include an internal combustion engine configured to combust a mixture of air and fuel (diesel, gasoline, etc.) within cylinders to drive pistons that rotatably turn and generate drive torque at a crankshaft. The drive torque at the crankshaft is then selectively transferred to a driveline via a conventional transmission (e.g., a conventional multi-speed automatic transmission) for vehicle propulsion. The transmission includes a plurality of clutches to engage/disengage a plurality of gears for multiplying the drive torque at the engine (i.e., the crankshaft) to a final gear ratio at the driveline. The transmission is often controlled by a separate transmission control module (TCM), which informs other control modules of the vehicle (e.g., an engine control module, or ECM) of a shift request between gears of the transmission.

The other control modules of the vehicle, such as the ECM, may vary respective component operation during the transmission shift. The ECM, for example, could adjust the torque output of the engine to perform a smoother (e.g., synchronized) shift operation of the transmission. There are delays, however, in communicating the shift request from the TCM to the ECM (e.g., a controller area network, or CAN delay) and in subsequently controlling the engine in anticipation of the shift operation. These delays often result in poor shift quality/performance, which could be noticeable to a driver of the vehicle. Accordingly, while such conventional engine and transmission control systems do work well for their intended purpose, there exists an opportunity for improvement in the relevant art.

SUMMARY

According to one example aspect of the invention, a predictive transmission shift request and engine torque control system for a vehicle is presented. In one exemplary implementation, the system comprises an engine comprising engine torque actuators and configured to generate drive torque that is transferred to a driveline of the vehicle via an automatic transmission controlled by a transmission control module (TCM) and an engine control module (ECM) configured to communicate with the TCM via a controller area network (CAN) and to control the engine to transmit, to the TCM, a set of engine torque information indicative of a status of the engine, statuses of the engine torque actuators, and torque capabilities of the engine, receive, from the TCM, a predictive shift request generated by the TCM based on a set of known time delays and the set of engine torque information after determining, by the TCM, to perform a shift operation of the transmission, control the engine torque actuators in response to and based on the predictive torque request to prepare the engine for the transmission shift operation, receive, from the TCM, an actual shift request indicative the TCM and the transmission beginning to execute transmission shift operation, and control the engine torque actuators in response to and based on the actual shift request to adjust a torque output of the engine during the transmission shift operation to provide a faster and smoother transmission shift.

In some implementations, the automatic transmission and the TCM are produced by a third-party supplier and the internal signals utilized by the TCM are not accessible by the ECM. In some implementations, the set of known time delays includes CAN latency and engine torque actuator actuation delays. In some implementations, the set of known time delays further includes at least one of software processing delays and sensor measurement delays. In some implementations, the engine torque capabilities include current engine torque capability at the current engine torque actuator statuses and minimum/maximum engine torque capabilities by varying the engine torque actuator statuses between minimum and maximum values. In some implementations, the predictive and actual shift requests each indicate (i) a requested engine torque increase or decrease, (ii) a requested engine torque profile, and (iii) a requested priority of the engine torque actuators.

In some implementations, the ECM controls the engine torque actuators based on the predictive shift request to prepare the engine for the future shift operation by adjusting air and spark engine torque actuators to create a torque reserve without impacting the engine's output torque. In some implementations, the ECM controls the engine torque actuators based on the actual shift request by controlling the engine torque actuators according to the requested engine torque increase/decrease, the requested engine torque profile, and the requested priority of the engine torque actuators to adjust the engine output torque during the transmission shift operation. In some implementations, the automatic transmission is a step-gear torque converted automatic transmission. In some implementations, the automatic transmission does not have an electric motor associated therewith for shift management assistance.

According to another example aspect of the invention, a predictive transmission shift request and engine torque control method for a vehicle is presented. In one exemplary implementation, the method comprises providing an ECM configured to communicate with a TCM via a CAN and to control an engine comprising engine torque actuators and configured to generate drive torque that is transferred to a driveline of the vehicle via an automatic transmission controlled by the TCM, transmitting, from the ECM and to the TCM, a set of engine torque information indicative of a status of the engine, statuses of the engine torque actuators, and torque capabilities of the engine, receiving, by the ECM and from the TCM, a predictive shift request generated by the TCM based on a set of known time delays and the set of engine torque information after determining, by the TCM, to perform a shift operation of the transmission, controlling, by the ECM, the engine torque actuators in response to and based on the predictive torque request to prepare the engine for the transmission shift operation, receiving, by the ECM and from the TCM, an actual shift request indicative the TCM and the transmission beginning to execute transmission shift operation, and controlling, by the ECM, the engine torque actuators in response to and based on the actual shift request to adjust a torque output of the engine during the transmission shift operation to provide a faster and smoother transmission shift.

In some implementations, the automatic transmission and the TCM are produced by a third-party supplier and the internal signals utilized by the TCM are not accessible by the ECM. In some implementations, the set of known time delays includes CAN latency and engine torque actuator actuation delays. In some implementations, the set of known time delays further includes at least one of software processing delays and sensor measurement delays. In some implementations, the engine torque capabilities include current engine torque capability at the current engine torque actuator statuses and minimum/maximum engine torque capabilities by varying the engine torque actuator statuses between minimum and maximum values. In some implementations, the predictive and actual shift requests each indicate (i) a requested engine torque increase or decrease, (ii) a requested engine torque profile, and (iii) a requested priority of the engine torque actuators.

In some implementations, the ECM controls the engine torque actuators based on the predictive shift request to prepare the engine for the future shift operation by adjusting air and spark engine torque actuators to create a torque reserve without impacting the engine's output torque. In some implementations, the ECM controls the engine torque actuators based on the actual shift request by controlling the engine torque actuators according to the requested engine torque increase/decrease, the requested engine torque profile, and the requested priority of the engine torque actuators to adjust the engine output torque during the transmission shift operation. In some implementations, the automatic transmission is a step-gear torque converted automatic transmission. In some implementations, the automatic transmission does not have an electric motor associated therewith for shift management assistance.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
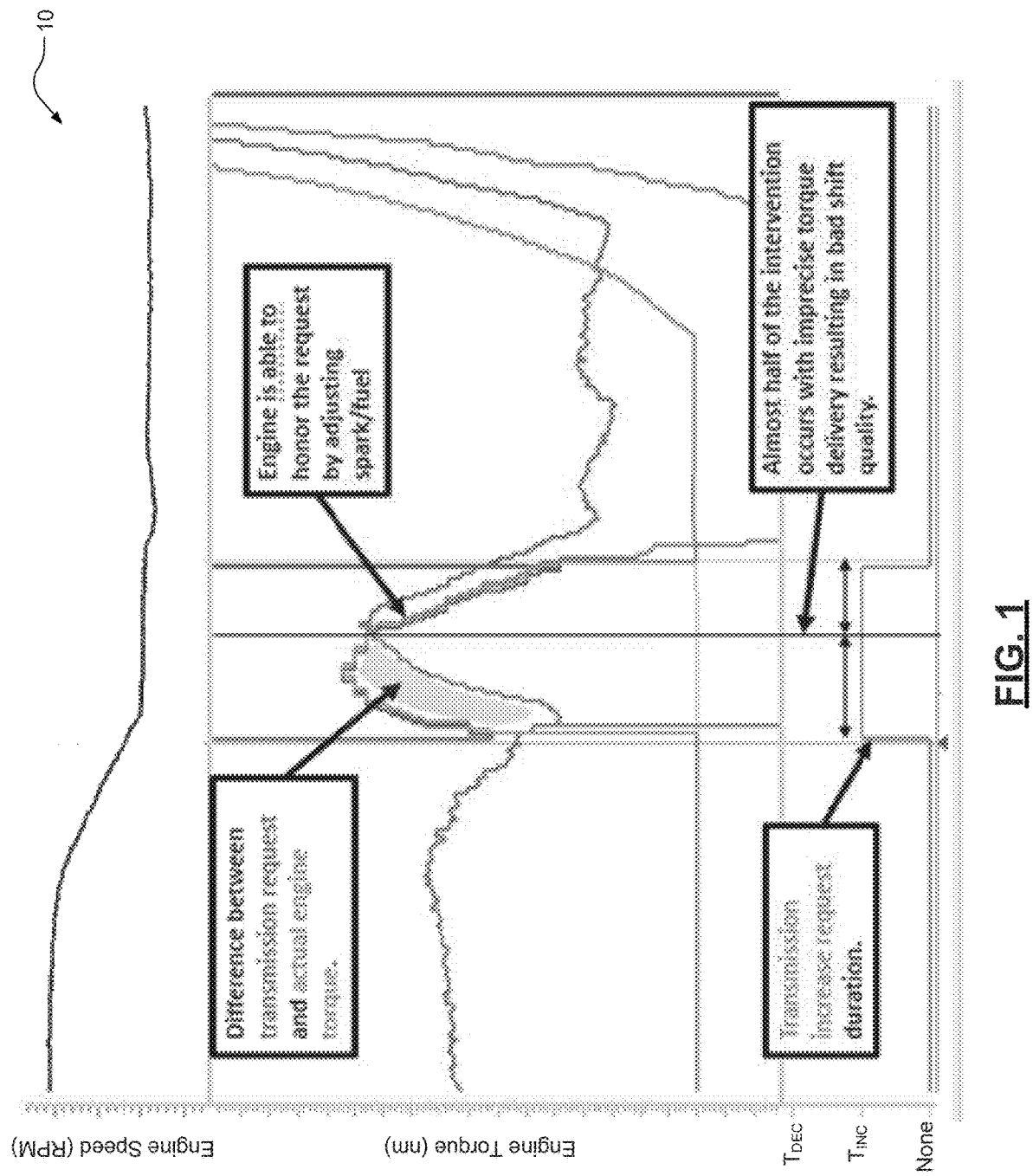
FIG. 1 is an example plot illustrating the delays between conventional transmission shift requests and engine torque controls for an example transmission shift operation according to the principles of the present application.

As previously discussed, there are often delays in communicating a shift request from a transmission control module (TCM) to an engine control module (ECM) and in subsequently controlling the engine in anticipation of the shift operation. These delays include, for example, controller area network (CAN) delays and engine actuator actuation delays. These delays often result in poor shift quality/performance, which could be noticeable to a driver of the vehicle. The issue of delayed engine response when the TCM makes a request for a shift, for example, could last up to ~0.5 seconds. The engine torque is constrained by engine airflow physics (the amount of air drawn from the throttle body inertia, intake manifold filling, intake value/spring inertia, friction, etc.) and is not able to accurately provide the torque requested within the time frame of shift execution, thereby degrading the shift quality followed by a post-shift torque spike or dip. This issue is solely due to constraints of engine physics (which is why airflow actuators, such as a throttle valve, are considered slow-path engine torque actuators), with the added delays of CAN latency and software processing times only worsening the shift degradation. This problem is illustrated in the example plot 10 of FIG. 1.

One conventional solution to address this problem is to extensively calibrate both the engine and the transmission. In many cases, however, the transmission and the TCM are provided to an original equipment manufacturer (OEM) by a third-party supplier, and thus the OEM (and more specifically, the ECM) does not have access to the internal signals utilized by the TCM. Thus, such calibration could be very difficult and limited in real-time capabilities, requiring human expertise to oversee and calibrate with an acceptable solution for all maneuver/use cases. Thus, calibration may not even be fully capable of fully mitigating/eliminating the shift delay. Other conventional solutions to this problem could include utilizing specific types of transmissions, such as dual clutch transmissions (DCTs), that mitigate or eliminate shift delays, or utilizing an electric motor for shift management assistance instead of direct engine participation. Both of these solutions increase costs over a powertrain having a conventional multi-speed automatic transmission and an engine and are also not backwards-compatible (i.e., as a software update to legacy or existing vehicles).

Accordingly, improved transmission and engine control techniques are presented herein. The techniques of the present application involve the use of a calculated predictive torque request from the TCM to adjust engine torques actuators (air/fuel/spark) to ensure that when the actual shift request by the TCM is commanded, the engine delivers the required torque without a delay, thereby improving shift time and maintaining torque accuracy at the engine flywheel. These techniques use a conventional multi-speed automatic transmission (e.g., a step gear, torque converted transmission) and conventional/existing engine hardware configuration to improve shift time overcoming and accounting for all noises (CAN latency, software processing time, sensor/actuator processing time, working temperature variations, atmospheric conditions variations, etc.) in the logic of predictive torque estimation and ensures the engine is prepared to deliver the anticipated torque without any delay when commanded. These techniques only require a CAN interface update between the TCM and the ECM to communicate various levels of torque that can be made based on air/fuel/spark adjustments which is processed by the TCM considering the noises mentioned above, to make a calculated predictive shift torque request to the ECM before the actual shift request by the TCM is commanded. In response to and based on the predictive shift torque request, the ECM pre-adjusts torque actuators (e.g., air and spark) and readies the actuator(s) for an anticipated actual torque request.

Potential benefits include improved shift quality, significantly improved accuracy of delivered torque, and improving or at least maintaining emissions targets. In addition, the techniques of the present application also reduce costs (or do not increase costs) in comparison to the above-described conventional solutions. More specifically, no hardware changes are required by the techniques of the present application (new sensors/actuators, a special DCT-type transmission, an electric motor for shift management assistance, etc.). Rather, the techniques of the present application are purely software and CAN interface based solutions. In contrast to the above-described conventional transmission/engine calibration solution, which could substantially increase development/calibration costs (e.g., needing human intervention to perform precise calibrations), the techniques of the present application are a physics-based and thermodynamically-based solution. The techniques of the present application are also portable or applicable to other existing vehicles (e.g., older/legacy or otherwise adaptable vehicles) having an appropriate hardware configuration in place (an engine with a conventional step-gear torque converted multi-speed automatic transmission).

Figure 2:
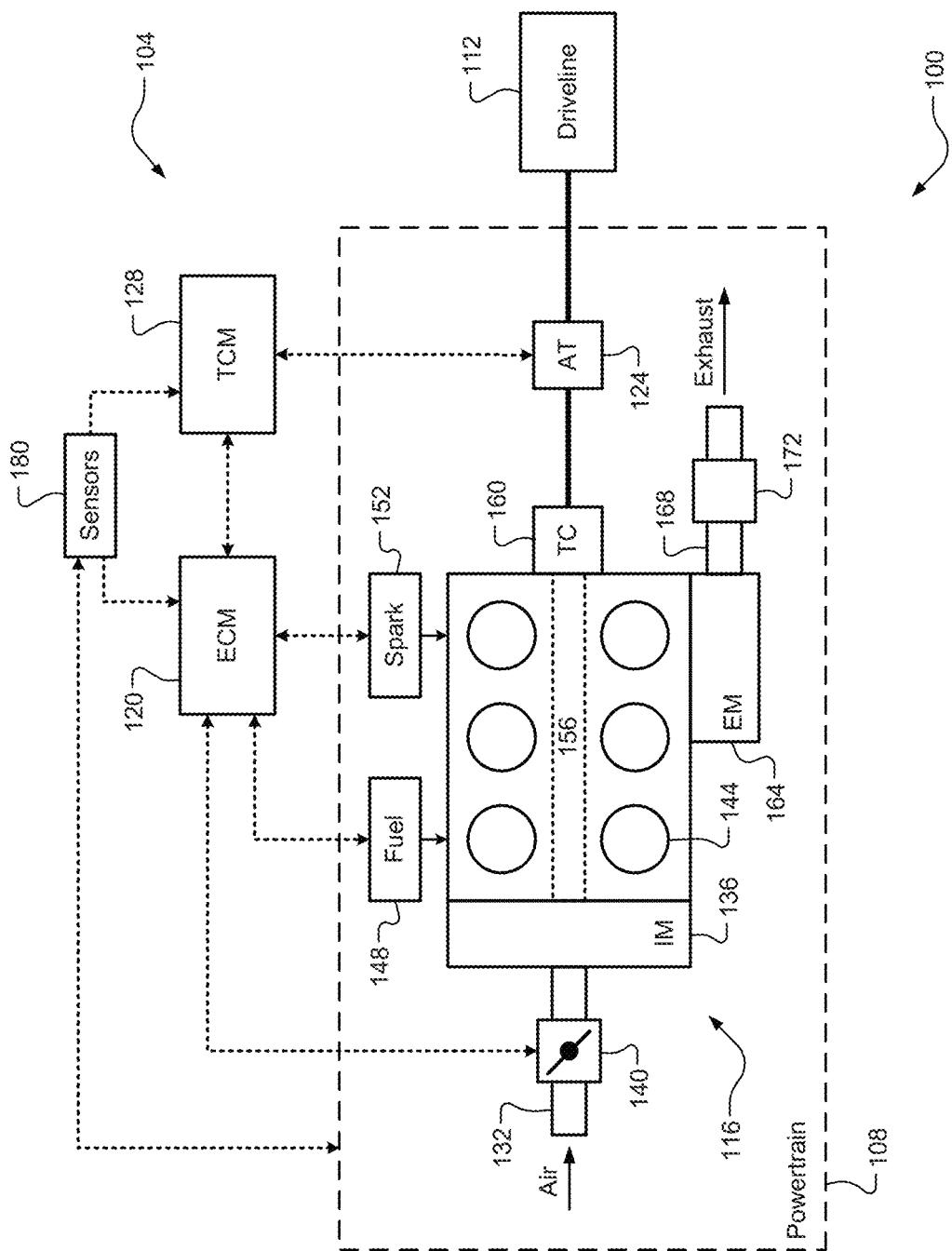
FIG. 2 is a diagram of a vehicle having an example predictive transmission shift request and engine torque control system according to the principles of the present application.

Referring now to FIG. 2, a diagram of a vehicle 100 having an example predictive transmission shift request and engine control system 104 according to the principles of the present application is illustrated. The vehicle 100 generally comprises a powertrain 108 that generates and transfers drive torque to a driveline 112 for propulsion of the vehicle 100. The powertrain 108 primarily includes an internal combustion engine 116, controlled by an ECM 120, that generates drive torque, which is transferred to the driveline via an automatic transmission (AT) 124, controlled by a TCM 128. The ECM 120 and the TCM 128 also receive measurements from vehicle or powertrain sensors 180, which will be discussed more fully below. While not shown, it will be appreciated that the powertrain 108 could be an electrified or hybrid powertrain that includes other components, such as one or more electric motors and respective high voltage battery system (s), but these other devices are not necessary for the techniques of the present application. It will also be appreciated that the transmission 124 could be any suitable step-gear, torque converted multi-speed automatic transmission, including specialized automatic transmissions such as a DCT, even though a DCT-type configuration is not necessary for the techniques of the present application.

The engine 116 draws air through an induction or intake system 132 and into an intake manifold (IM) 136. The airflow through the induction system 132 and the air pressure in the intake manifold 136 is regulated or controlled by a throttle valve 140. The air in the intake manifold 136 is distributed to a plurality of cylinders 144 (via respective intake valves, not shown) and combined with fuel (gasoline, diesel, etc.) from a fuel system 148 (fuel tank, fuel pump, fuel rail, fuel injectors, etc.) to form a fuel/air mixture in each of the cylinders 144. While six cylinders are shown, it will be appreciated that the engine 116 could include any suitable number of cylinders (4, 8, 10, 12, etc.) arranged in in-line or banked (e.g., V) configurations. The fuel/air mixture is compressed by pistons (not shown) within the respective cylinders 144 and the compressed fuel/air mixture is ignited by spark from a spark system 152 (ignition coils, spark plugs, etc.) to drive the pistons, which rotatably turn a crankshaft 156 and generate drive torque. The drive torque at the crankshaft 156 is converted and transferred to the automatic transmission 124 via a torque converter (TC) 160. Exhaust gas resulting from combustion is expelled from the cylinders 144 (via respective exhaust valves, not shown) and into an exhaust manifold (EM) 164, where it then passes through an exhaust system 168 having one or more exhaust treatment devices 172 for mitigating or eliminating emissions before release into the atmosphere.

The techniques of the present application can be divided into three parts for improved understanding/description and corresponding illustration. These three parts or aspects include (1) the communication interface between the TCM 128 and the ECM 120, (2) engine torque actuation, and (3) delivered torque gradient management.

Figure 3:
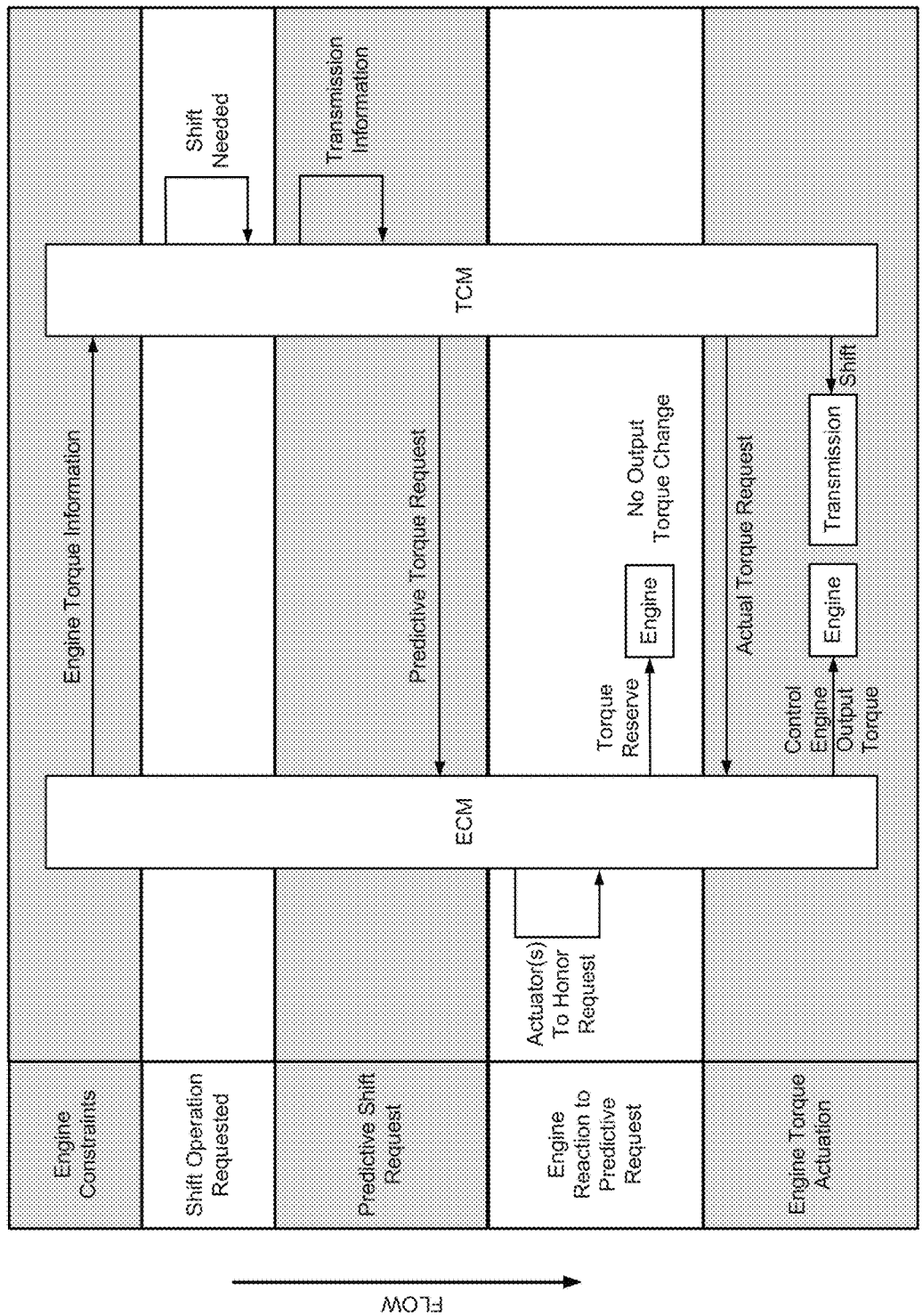
FIG. 3 is a dataflow diagram illustrating example communication interface between an engine control module (ECM) and a transmission control module (TCM) according to the principles of the present application.
Figure 4:
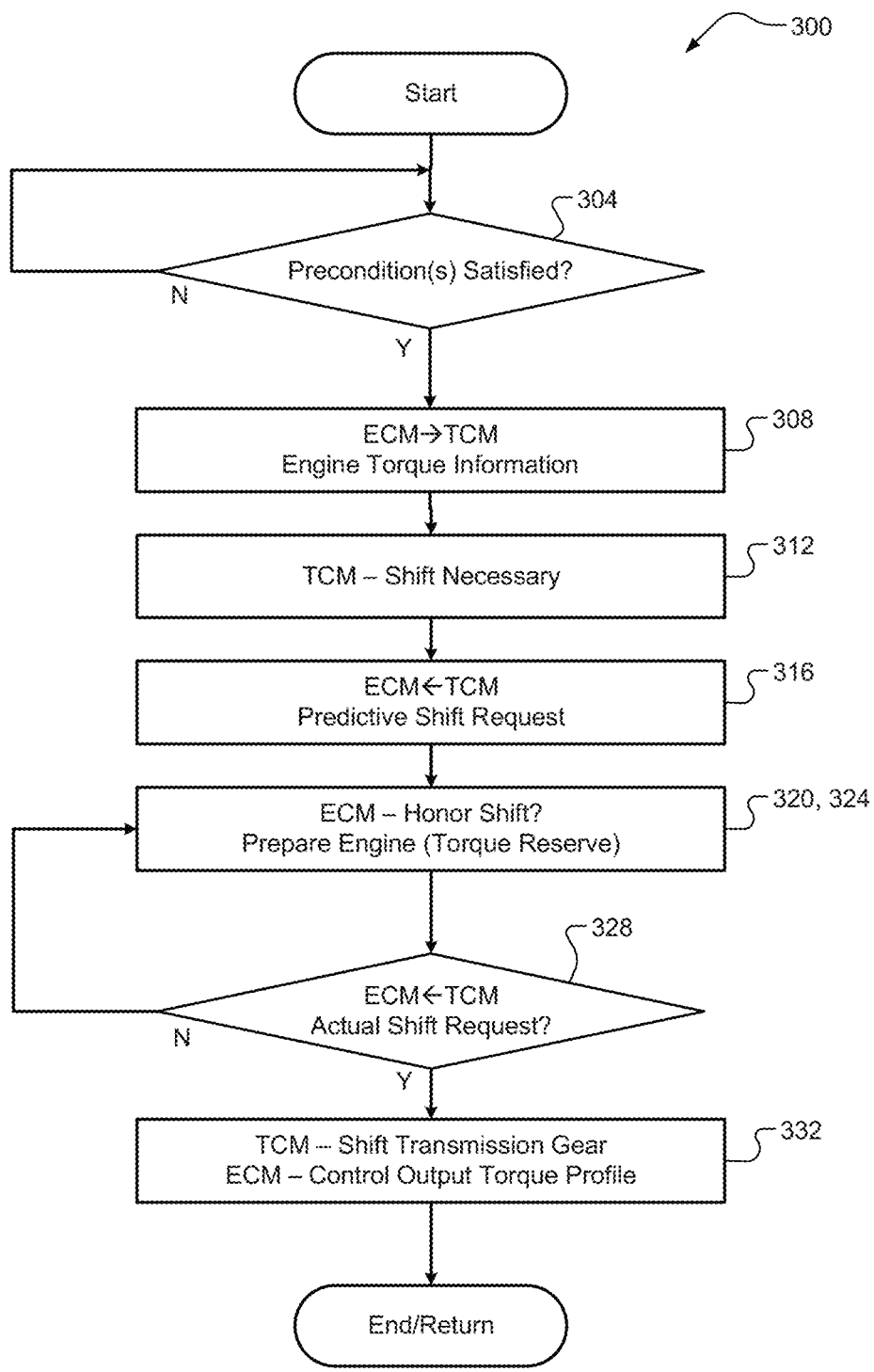
FIG. 4 is a flow diagram of an example predictive transmission shift request and engine torque control method for a vehicle according to the principles of the present application.

Referring now to FIGS. 3-4 and with continued reference to FIG. 2, a dataflow diagram 200 illustrating an example communication interface between the ECM 120 and the TCM 128 and a flow diagram illustrating an example predictive transmission shift request and engine torque control method 300 according to the principles of the present application are illustrated. The method 300 could begin only when an optional set of preconditions are satisfied, such as the engine 116 being on/running and there being no malfunctions or faults (e.g., transmission/engine malfunctions) that would otherwise affect the operation of the method 300. When satisfied, the method 300 proceeds to 308. Otherwise, the method 300 could end or waiting until these precondition(s) are satisfied. Initially at 308, the engine control module 120 communicates real-time engine torque actuator 140, 148, 152 statuses and corresponding engine torque that can be achieved based on if certain actuator is modulated or via combination of various actuators together (e.g., minimum/maximum torque capabilities of the engine 116 for all the various engine torque actuator settings). These torque actuators/statuses include slow-path actuators for airflow (e.g., position of the throttle valve 140) and fuel (amount of fuel injected by the fuel system 148) and fast-path actuators (timing/retardation of spark supplied by the spark system 152).

The ECM 120 could also provide its constraints and limitation to ensure the requested torque for shift management is within an acceptable range and, optionally, whether fuel shutoff is available. The TCM 128 communicates its current losses and clutch capacity gradients along with the predictive torque request, and subsequently/later an actual torque request, to the ECM 120. More specifically, at 312, the TCM 128 uses the information from the ECM 120 to calculate whether a shift operation of the transmission 124 is necessary and, if true, the torque needed to perform the future shift operation, including estimating known time delays such as CAN latency delays, software processing times, and/or other similar delays as discussed herein, and decides the actuator (e.g., fuel only) it needs from engine 116 to actuate the torque. The TCM 128 could also estimate other time delays such as the engine torque actuator delays and accordingly it sends out the predictive shift request at 316 prior to (e.g., a calibratable number of milliseconds before) the actual shift request.

At 320-332, engine torque actuation is divided into multiple steps (two or three) depending on whether the request is an engine torque increase or decrease. In a first step, the predictive shift request indicates a torque increase request or torque decrease request, which is received and acted on by the ECM 120 by initiating the engine torque actuator adjustment(s) with ensuring no access torque is delivered at the flywheel or TC 160 until the actual shift request is received at 328 (i.e., preparing the engine 116 for the anticipated shift request). For a torque increase request, there are two subsequent steps (steps two and three). In the second step (step two), if the torque increase request is higher than the current reference flywheel/TC torque, the ECM 120 actuates throttle valve 140 to increase the air followed by a spark retard via spark system 152 to ensure no over delivery of torque at flywheel. In the third step (step three), when the actual shift request is received, the ECM 120 instantaneously honors the request by spark adjustment via the spark system 152 (fast-path) to ensure no delay. This depletes the air (the torque reserve) and post-shift its returns to normal condition, hence maintaining an accurate post-shift torque delivery with no bumps or oscillations. For a torque decrease request, there is effectively no second step as airflow rate is kept constant. In the next/following step, if the torque decrease request is lower than the current reference flywheel torque, the ECM 120 monitors for a fuel cut, if allowed, and a request flag from the TCM 120. The following possibilities could occur. When fuel cut is not allowed, then ECM 120 actuates the request with spark and air only (spark system 152 and throttle valve 140). When fuel cut is allowed, then the ECM 120 prioritizes based on the predictive shift request to use spark (via spark system 152) and/or pattern the cylinder fuel cutoff (via fuel system 148).

Lastly, when fuel cut is allowed and specifically requested, then the ECM 120 prioritizes fuel cut to achieve the torque decrease followed by spark adjustments via the spark system 152. The strategy may benefit with a performance shift which is expected in sports drive modes by providing instantaneous torque reductions for more aggressive shifts. Note that the throttle valve 140 is kept constant, and the reduction is achieved only by spark and/or fuel via the respective actuators 152, 148. The delivered torque profile management can be performed as follows. First, the TCM 128 could communicate the actual torque request to the ECM 120 to ensure the torque produced at flywheel follows a desired profile ensuring not over or underproducing of torque. This also reduces any probabilities of bumps/oscillations. In some example implementations, the ECM 120 could ensure that the delivered torque never crosses a minimum and maximum range/gradient provided by the transmission, either during or outside of a shift event (i.e., at any time). The final shift operation at 332 includes a coordinate control of the gear shift of the transmission 124 by the TCM 128 and the torque output of the engine 116 as described above. The method 300 then ends or returns to 304 for one or more additional cycles (e.g., subsequent shift events).

It will be appreciated that the terms "controller" and "control module" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller or control module to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A predictive transmission shift request and engine torque control system for a vehicle, the system comprising:
    an engine comprising engine torque actuators and configured to generate drive torque that is transferred to a driveline of the vehicle via an automatic transmission controlled by a transmission control module (TCM); and
    an engine control module (ECM) configured to communicate with the TCM via a controller area network (CAN) and to control the engine to:
        transmit, to the TCM, a set of engine torque information indicative of a status of the engine, statuses of the engine torque actuators, and torque capabilities of the engine;
        receive, from the TCM, a predictive shift request generated by the TCM based on a set of known time delays and the set of engine torque information after determining, by the TCM, to perform a shift operation of the transmission;
        control the engine torque actuators in response to and based on the predictive torque request to prepare the engine for the transmission shift operation;
        receive, from the TCM, an actual shift request indicative the TCM and the transmission beginning to execute transmission shift operation; and
        control the engine torque actuators in response to and based on the actual shift request to adjust a torque output of the engine during the transmission shift operation to provide a faster and smoother transmission shift.

2. The system of claim 1, wherein the automatic transmission and the TCM are produced by a third-party supplier and the internal signals utilized by the TCM are not accessible by the ECM.

3. The system of claim 1, wherein the set of known time delays includes CAN latency and engine torque actuator actuation delays.

4. The system of claim 3, wherein the set of known time delays further includes at least one of software processing delays and sensor measurement delays.

5. The system of claim 3, wherein the engine torque capabilities include current engine torque capability at the current engine torque actuator statuses and minimum/maximum engine torque capabilities by varying the engine torque actuator statuses between minimum and maximum values.

6. The system of claim 1, wherein the predictive and actual shift requests each indicate (i) a requested engine torque increase or decrease, (ii) a requested engine torque profile, and (iii) a requested priority of the engine torque actuators.

7. The system of claim 6, wherein the ECM controls the engine torque actuators based on the predictive shift request to prepare the engine for the future shift operation by adjusting air and spark engine torque actuators to create a torque reserve without impacting the engine's output torque.

8. The system of claim 7, wherein the ECM controls the engine torque actuators based on the actual shift request by controlling the engine torque actuators according to the requested engine torque increase/decrease, the requested engine torque profile, and the requested priority of the engine torque actuators to adjust the engine output torque during the transmission shift operation.

9. The system of claim 1, wherein the automatic transmission is a step-gear torque converted automatic transmission.

10. The system of claim 1, wherein the automatic transmission does not have an electric motor associated therewith for shift management assistance.

11. A predictive transmission shift request and engine torque control method for a vehicle, the method comprising:
providing an engine control module (ECM) configured to communicate with a transmission control module (TCM) via a controller area network (CAN) and to control an engine comprising engine torque actuators and configured to generate drive torque that is transferred to a driveline of the vehicle via an automatic transmission controlled by the TCM;
transmitting, from the ECM and to the TCM, a set of engine torque information indicative of a status of the engine, statuses of the engine torque actuators, and torque capabilities of the engine;
receiving, by the ECM and from the TCM, a predictive shift request generated by the TCM based on a set of known time delays and the set of engine torque information after determining, by the TCM, to perform a shift operation of the transmission;
controlling, by the ECM, the engine torque actuators in response to and based on the predictive torque request to prepare the engine for the transmission shift operation;
receiving, by the ECM and from the TCM, an actual shift request indicative the TCM and the transmission beginning to execute transmission shift operation; and
controlling, by the ECM, the engine torque actuators in response to and based on the actual shift request to adjust a torque output of the engine during the transmission shift operation to provide a faster and smoother transmission shift.

12. The method of claim 11, wherein the automatic transmission and the TCM are produced by a third-party supplier and the internal signals utilized by the TCM are not accessible by the ECM.

13. The method of claim 11, wherein the set of known time delays includes CAN latency and engine torque actuator actuation delays.

14. The method of claim 13, wherein the set of known time delays further includes at least one of software processing delays and sensor measurement delays.

15. The method of claim 13, wherein the engine torque capabilities include current engine torque capability at the current engine torque actuator statuses and minimum/maximum engine torque capabilities by varying the engine torque actuator statuses between minimum and maximum values.

16. The method of claim 11, wherein the predictive and actual shift requests each indicate (i) a requested engine torque increase or decrease, (ii) a requested engine torque profile, and (iii) a requested priority of the engine torque actuators.

17. The method of claim 16, wherein the ECM controls the engine torque actuators based on the predictive shift request to prepare the engine for the future shift operation by adjusting air and spark engine torque actuators to create a torque reserve without impacting the engine's output torque.

18. The method of claim 17, wherein the ECM controls the engine torque actuators based on the actual shift request by controlling the engine torque actuators according to the requested engine torque increase/decrease, the requested engine torque profile, and the requested priority of the engine torque actuators to adjust the engine output torque during the transmission shift operation.

19. The method of claim 11, wherein the automatic transmission is a step-gear torque converted automatic transmission.

20. The method of claim 11, wherein the automatic transmission does not have an electric motor associated therewith for shift management assistance.

* * * * *